United States Patent [19]

Asada et al.

[11] 4,053,697
[45] Oct. 11, 1977

[54] PROCESS FOR PRODUCING PROPYLENE HOMOPOLYMERS AND COPOLYMERS

[75] Inventors: Mamoru Asada; Akinobu Shiga; Kiyoshi Matsuyama, all of Ehime, Japan

[73] Assignee: Sumitomo Chemical Company, Limited, Osaka, Japan

[21] Appl. No.: 541,554

[22] Filed: Jan. 16, 1975

[30] Foreign Application Priority Data

Jan. 16, 1974 Japan .................................... 49-8070

[51] Int. Cl.² ............................................. C08F 4/16
[52] U.S. Cl. ..................................... 526/142; 526/135; 526/136; 526/137; 526/139; 526/140; 526/151; 526/154; 526/159; 526/351; 528/498; 252/429 B
[58] Field of Search ................. 260/88.2, 93.7, 94.9 F, 260/96 R, 705; 450/773, 775.5; 526/138, 146, 159, 119, 142, 151

[56] References Cited

U.S. PATENT DOCUMENTS

| | | | |
|---|---|---|---|
| 2,558,557 | 6/1951 | Hess et al. ............................. | 260/705 |
| 3,074,921 | 1/1963 | Carter .............................. | 260/94.9 F |
| 3,280,090 | 10/1966 | Scoggin .......................... | 260/94.9 F |
| 3,825,524 | 7/1974 | Wada et al. ...................... | 260/94.9 C |

*Primary Examiner*—Stanford M. Levin
*Attorney, Agent, or Firm*—Sughrue, Rothwell, Mion, Zinn and Macpeak

[57] ABSTRACT

A process for producing a homopolymer of propylene or a copolymer of propylene which comprises polymerizing propylene or a mixture of propylene and another unsaturated hydrocarbon monomer such as ethylene in liquid propylene, in the presence of a catalyst system consisting essentially of (a) an activated titanium compound obtained by reducing titanium tetrachloride with an organic aluminum compound and activating the resulting titanium compound and (b) an organic aluminum compound to produce a polymer slurry, introducing the polymer slurry into an upper part of a counter-current washing zone, such as a washing tower, and counter-currently contacting the polymer slurry with liquid propylene which is introduced into a lower part of the washing zone, whereby the polymer and catalyst residues dissolved in the polymer slurry are removed.

5 Claims, 2 Drawing Figures

4,053,697

PROCESS FOR PRODUCING PROPYLENE HOMOPOLYMERS AND COPOLYMERS

BACKGROUND OF THE INVENTION

1. Field of the Invention

The present invention relates to a process for producing homopolymers and copolymers of propylene and copolymers of propylene and other unsaturated hydrocarbon monomers. More specifically, the present invention relates to a process which comprises carrying out a polymerization in liquid propylene (hereinafter, designated "bulk polymerization" for brevity) and obtaining a homopolymer of propylene and/or a copolymer of propylene and other unsaturated hydrocarbon monomers, such as ethylene.

2. Description of the Prior Art

Bulk polymerization is well known, has been carried out on a commercial scale and is quite advantageous. The vapor pressure of the solvent, which is unsaturated hydrocarbon monomers of which the greater part is propylene, in the polymer slurry obtained by bulk polymerization is higher than that of the conventional slurry or solvent polymerization which uses liquid saturated hydrocarbons having more than 5, preferably from 5 to 7, carbon atoms as a solvent (hereinafter, designated "conventional slurry polymerization" for brevity), so the polymer produced can be easily separated from the slurry simply by reducing the pressure.

However, generally some disadvantages exist with the polymer separated from the solvent using the above described method. Firstly, the polymer contains a large amount of polymer soluble in boiling n-heptane. Secondly, the polymer contains a large amount of catalyst residues. It is essentially possible to reduce catalyst residues in the bulk polymerization, because the polymerization reaction rate is faster than that of the conventional slurry polymerization and the polymerization can be carried out at a desirable catalyst efficiency.

Therefore, the omission of the slurry treatment process which removes the polymer soluble in boiling n-heptane under the above described conditions enables a significant economic effect to be achieved.

The polymer obtained by the above described method in which the slurry treatment process is not used, however, has the following disadvantages in quality.

For example, the polymer obtained using a catalyst system of titanium trichloride and triethylaluminum contains only 75 to 85% by weight of polymer insoluble in boiling n-heptane, and in the case of using a catalyst system of titanium trichloride and a diethylaluminum halide the amount of the polymer insoluble in boiling n-heptane is 85 to 95% by weight.

The properties of the above described polymer are in particular not good with respect to stiffness and tackiness. The polymer, therefore, can be used as a moulding grade polymer but it is impossible to use the polymer as a film and fiber grade polymer since a film and fiber grade polymer must have superior quality.

For the purpose of improving the properties of the polymer, generally, the polymer slurry withdrawn from the polymerization zone or the polymer separated under reduced pressure from the unsaturated hydrocarbon monomers, of which the main portion is propylene, is treated with suitable catalyst deactivators, and then washed using a solvent which consists mainly of a saturated hydrocarbon liquid having 5 to 7 carbon atoms or a liquid unsaturated hydrocarbon monomer such as the propylene being polymerized in the reaction zone, whereby the solvent-soluble polymer and catalyst residues are extracted and removed.

The above described catalyst deactivators are agents which decompose the active catalysts and/or terminate the polymerization reaction by forming a complex compound with the catalysts suppressing the formation of high molecular weight polymer which degrades the quality and furthermore in the following washing zone, facilitate extraction of the treated catalyst residues into the solvent.

These catalyst deactivators are, generally, alcohols, ethers, ketones and chelating agents and so on. The deactivators can be used as they are or diluted with the same solvent used in the above described processing as a diluent.

To reduce the formation of the solvent-soluble polymer, the following various methods are generally adopted.

For instance, in one method a catalyst system consisting of the complex compound of titanium halide and aluminum halide is used. In another method compounds which are described hereinafter as the third component are added to the catalyst system or the polymerization system to improve the polymerization conditions such that the polymerization reaction temperature can be reduced. In the above described methods, a fairly large amount of the solvent-soluble polymer is produced and it is difficult to omit the process for removal of the above described solvent-soluble polymer.

SUMMARY OF THE INVENTION

In order to overcome the above described defects, research was conducted and the present invention was achieved.

The present invention provides a bulk polymerization process for producing a homopolymer of a copolymer of propylene which comprises polymerizing propylene or a mixture of propylene and at least one other unsaturated hydrocarbon monomer, such as ethylene, in liquid propylene, in the presence of a catalyst system consisting essentially of (a) a titanium compound obtained by reducing titanium tetrachloride with an organic aluminum compound and activating the resulting titanium compound and (b) an organic aluminum compound, to form a polymer slurry, introducing the polymer slurry withdrawn from a polymerization zone into an upper part of a counter-current washing zone, and countercurrently contacting the polymer slurry with liquid propylene introduced into a lower part of the washing zone, whereby the solvent-soluble polymer and catalyst residues dissolved in the polymer slurry are removed.

DETAILED DESCRIPTION OF THE INVENTION

Figure 2:
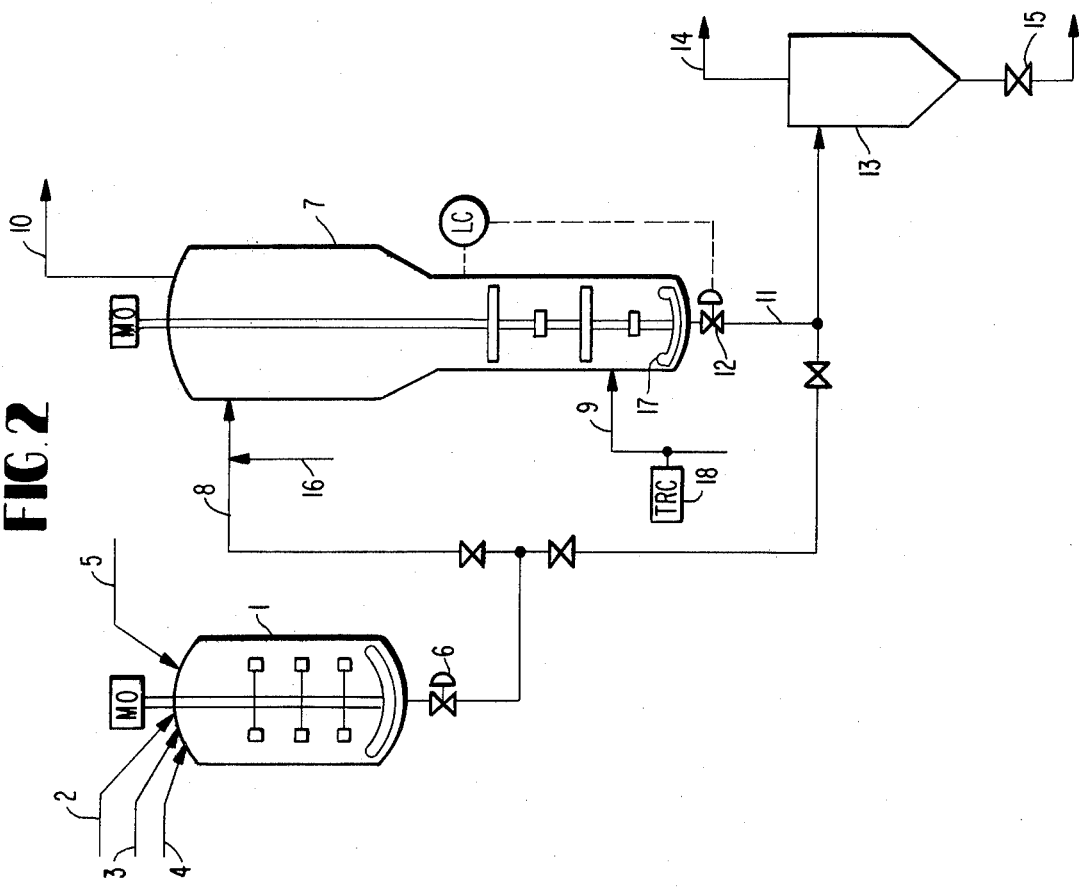
FIGS. 1 and 2 are schematic flow diagram representations of embodiments of the process of this invention.

In the present invention, the titanium compound used as a component of the catalyst system is a $\beta$-type titanium trichloride obtained by reducing titanium tetrachlorides with an organic aluminum compound as the starting material in order to produce a highly active titanium compound, and then treating with a complexing agent, an organic aluminum compound and titanium tetrachloride.

The above described catalyst has at least more than three times the activity compared with that of the catalyst obtained by a well-known method such as only heat treatment (for example, as disclosed in Japanese patent publication No. 20501/1964).

In greater detail, for example, the solid catalyst obtained by the method disclosed in U.S. Pat. No. 3,960,765 (corresponding to Japanese patent application No. 123781/1973) is suitable for use in the present invention, which disclosure is incorporated herein by reference.

The polymerization process which can be employed in this invention and the parameters relative thereto are described in detail in Japanese Laid-Open patent publication No. 34478/1972 which disclosure is incorporated herein by reference. That is, in this method, a highly activated catalyst as described above can be employed for the polymerization of propylene alone or with one or more other unsaturated hydrocarbon monomers as described above.

The catalyst used in this invention is (a) an activated titanium compound and (b) an organo-aluminum compound. This catalyst can also include a well-known third component, e.g., amine, ether, ester, sulfur, halogen, benzene, derivatives of azulene, organic nitrogen, inorganic nitrogen and phosphoric and phosphorous compounds.

A catalyst not produced using conditions as descrived above, for example, a commercially available catalyst, i.e., titanium tetrachloride reduced with aluminum metal and ground, has a broad particle size distribution. If this catalyst is used in this invention, operation is not possible because the loss with the washed liquid in the counter current washing tower is very high, and the lost powder gives rise to difficulties in the piping and other pieces of equipment used in the production system.

If a catalyst which is obtained by reducing titanium tetrachloride with an organic aluminum compound and treating with heat, is used, the particle size distribution is suitable but the catalytic activity is not suitable. Even if bulk polymerization is adopted, the final product has a bad color, is inferior to commercially available products, and thus is not marketable.

In accordance with this invention, a polymer which is considerably less expensive in comparison with that produced by the usual method and which has equal or better quality than commercially available polymer can be produced.

According to another aspect of the invention, another unsaturated hydrocarbon monomer or monomers which are copolymerizable with propylene and which are straight chain olefins having less than six carbons, especially α-olefins such as ethylene, can also be used.

The polymerization conditions used in this invention are set at conditions such that the propylene is liquid. In addition the pressure, the temperature, the catalyst system, chain transfer agents, the concentration of stabilizers, agitating conditions cooling and heating conditions are set depending on the characteristics of the polymerization, e.g., polymerization rate, retention time etc., and the characteristics of the polymer, e.g., polymer yield, melt viscosity, impact strength etc.

Some of the features of the present invention are described below:

1. In liquid propylene, propylene is polymerized or copolymerized, using a catalyst system with very high activity and consisting essentially of as catalyst component (a), a titanium compound which is obtained by reducing titanium tetrachloride with an organo-aluminum compound, and activating the resulting product, and as catalyst component (b), an organo-aluminum compound.

2. The polymer which is soluble in a slurry, and residual catalyst which is soluble and/or suspended in a slurry, are easily separated from the product in the counter-current washing tower using liquid propylene as a washing solvent.

3. The refined propylene homopolymer and copolymer of propylene are obtained using the above-mentioned extracting and washing process on a slurry.

The invention will now be explained in greater detail by reference to the accompanying drawings.

Figure 1:
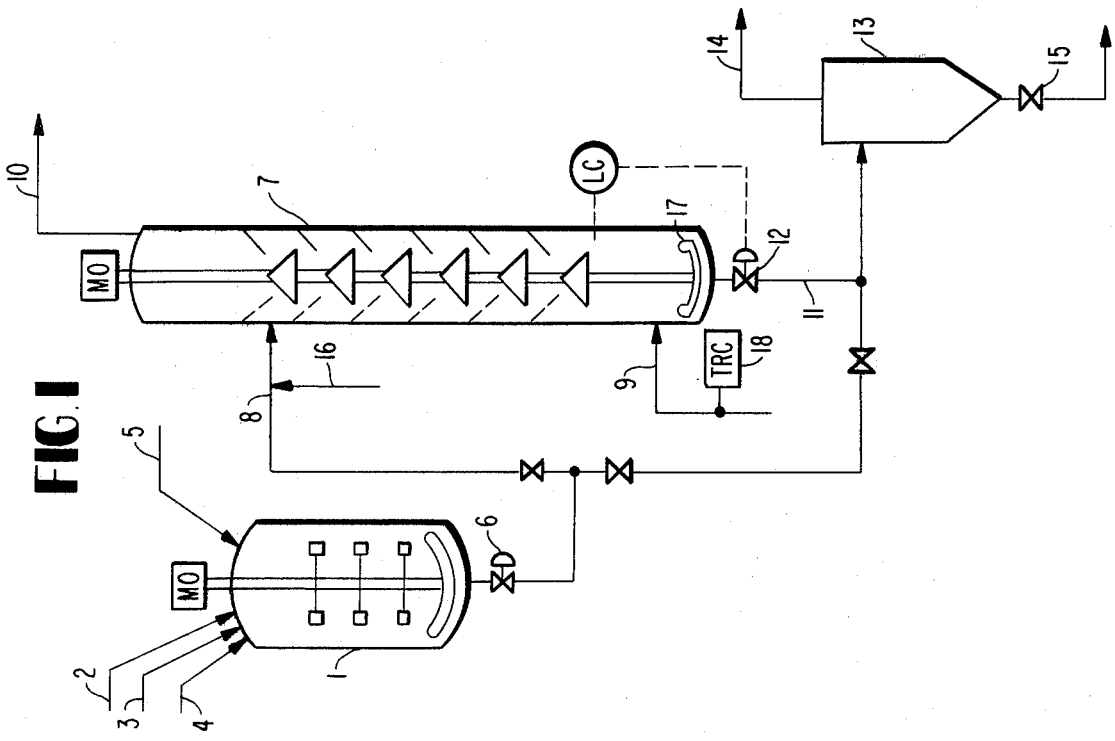

FIG. 1 illustrates an example of the process of this invention, and is given for the purpose of illustration only.

Liquid propylene is introduced to the reactor 1 through line 2. Unsaturated hydrocarbon monomer such as ethylene, chain transfer agent such as hydrogen and catalyst are introduced into the reactor 1 through line 3, 4 and 5, respectively.

The polymerization can be carried out at a temperature in the range of about 30° to 90° C under a pressure at which propylene exists as a liquid for 1 to 20 hours. A suitable pressure which can be employed generally to achieve such ranges from about 10 to 50 Kg/cm$^2$G. The polymerized slurry is introduced from reactor 1 intermittently or preferably continuously at the top 8 of the countercurrent washing tower 7 (hereinafter designated "top feed", for brevity). Liquid propylene, desirably fresh propylene without slurry soluble polymer, mainly non-crystallized polymer, is introduced into the bottom of the tower 7 through line 9 (hereinafter designated "bottom feed", for brevity).

The polymer dissolved slurry and residual catalyst in the slurry are selectively discharged through overflow line 10, and are introduced to the withdrawing process of non-crystallized polymer. The polymerization slurry is contacted counter-currently with the liquid propylene of the bottom feed of the tower 7, and the insoluble polymer in the polymerized slurry is selectively extracted from bottom line 11. The deposited slurry at the bottom of the tower, at a pressure ranging from about 10 to 50 Kg/cm$^2$G, is reduced to a pressure near atmospheric pressure by valve 12 which is interlocked with level or concentration controller LC and is introduced into the flash tank 13.

Volatile monomers, mainly liquid propylene, are vaporized in the flash tank 13 and discharged from line 14 to a recovery process.

The polymer separated in the flash tank directly or after treating the residual catalyst is sent to a hopper or an extruder. It is desirable to feed the chain transfer agent or catalyst deactivator, e.g., acetyl acetone, propylene oxide, etc. at line 9 or 16 to minimize difficulties due to the production of high molecular weight polymer in the washing tower, or degrading the polymer quality. The chain transfer agent or catalyst deactivator can be introduced directly or after dilution with liquid propylene.

In this invention, some of the characteristics of the counter-current washing tower are as described below.

1. Liquid propylene is the top feed is separated and extracted with the bottom feed rising from the bottom of the tower, through the over flow line at the top of the tower.

2. Insoluble polymer in the top feed is discharged from the bottom of the tower with a part of the bottom feed after washing by the bottom feed.

The counter-current washing tower is provided with baffle plates at the top feed plate in order to restrain the soluble polymer from proceeding with the polymer particles to the bottom, and the tower is partitioned into more than two, desirably more than five, compartments. The ratio of the opened and closed area of each partition plate is as small as possible, desirably 20 to 50%. The falling particles from the upper plate are made to collide with the partition plate, and moreover backmixing is restrained by increasing the bottom feed. As a result of these factors the effect of washing of the insoluble polymer in each compartment becomes higher. The first characteristic described above is satisfied comparatively easily by the above-described arrangement. To achieve the second characteristic, it is important that the deposit on each plate does not increase in order to prevent retention of insoluble polymer particles. It is desirable that an agitator is employed and agitation with low speed is used to scrape the polymer. Moreover, it is useful that the plate of each compartment, agitator, the bottom discharger, the baffle plates and each nozzle have a declivity of 0° or 10° to 80°, desirably 0° or 30° or 60°, so that the polymer particles fall due to the slope. It is more useful when a slow rotation is provided. The speed of the rotation preferably is about 1 to 20 rpm. A high speed above about 100 rpm has an opposite effect with respect to the second characteristic. It is further advantageous for the effect of washing that the partition plates themselves are revolved.

It is possible to feed hydrogen directly or with liquid propylene comparing with the polymerization conditions in the reactor in order to restrain production of high molecular weight polymer considering the new polymer product produced corresponding to the retention time distribution in the washing tower, and moreover in order to fix the quality of the final refined polymer e.g., melt viscosity etc. a mean retention time of the polymer is generally about 20 to 30 minutes, but this is to be considered exemplary and not limiting because the effect of washing is effected by the structure of the washing zone and the washing conditions.

The bottom feed liquid is introduced from line 9. A part of this liquid is mixed with the insoluble polymer which is separated by precipitation, and the insoluble polymer is at the same concentration as the top liquid of line 8, desirably more concentrated than the top feed liquid, and is mixed by scraper 17, and then is discharged from valve 12 interlocked with a level or concentration controller and a timer through line 11. The other part rises in the tower as the washing liquid and then is discharged from line 10 with the top feed liquid. When the flow rate of the washing liquid which rises in the washing tower (hereinafter designated "rising liquid" for brevity) becomes high, the effect of washing increases and back mixing of the top feed liquid is restrained, but small particles are discharged from line 10 and this adversely influences the slurry recycle pump, and loss of the product increases. This is not desirable. Therefore, for best operation the flow rate of the rising liquid ranges from about 1/5 to desirably ½ to 2, to the flow rate of the top feed. Under these conditions, the ratio of the insoluble polymer discharged from line 10 to the total polymer is about 10% compared with a commercially available powder. However, when the catalyst system of this invention, consisting essentially of (a) of a titanium compound obtained by reduction of titanium tetrachloride with an organo-aluminum compound and is activated, and (b) an organo-aluminum compound, or consisting essentially of the above described catalyst system with a carrier which has a narrow particle distribution, it is possible to decrease the loss of insoluble powder to less than about 2 to 5%. Moreover, better results are obtained, if a section of the top of the washing tower is expanded or a separating tank having a broader section than the washing tower is provided at line 10 and the deposited polymer is recycled to the washing tower.

The pressure of reactor 1 is fixed only by the polymerization temperature. Usually, the pressure is controlled by the temperature and/or the flow rate of the cooling water of the jacket of the reactor. It is sufficient for the pressure of the tower 7 to be 1 to 2 Kg/cm$^2$ lower than the pressure of the reactor 1. Thus, the temperature of the tower is several degrees lower than the temperature of the reactor. This operation is achieved easily when the temperature of the bottom feed liquid is controlled by temperature controller 18.

With respect to the structure of the partition plate of each compartment and of the agitator, a conical type such as is described in FIG. 1 is the most useful because back mixing of the rising liquid occurs with difficulty. A preferred embodiment of this invention is shown in FIG. 2, that is, a counter-current fluidized washing tower containing multiagitators constructed simply with straight paddles (installed in the vertical position with respect to the agitating axis) in the lower part of the tower provides a fluidized bed.

Generally speaking, centrifuging and filtration under high pressure are expected to provide a similar effect compared with the above described high pressure washing tower. Some of the features of this invention compared with centrifuging and filtering are as described below.

1. The construction of the apparatus is easy and no breakdown of the apparatus occurs because agitation by high speed revolution under high pressure is not nessesary.

2. The discharging operation of the refined polymer is easy because the polymer is discharged with the washing liquid.

3. The washing and separating effect is controlled freely.

For the purpose of illustration only this invention will now be described in greater detail by reference to the following examples. Of course, this invention is not to be construed as being limited to the following examples. Unless otherwise indicated all parts, precents, ratios and the like are by weight.

EXAMPLE 1

1. Catalyst Preparation i. After a 200 liter autoclave was charged with hexane (60 liters) and titanium tetrachloride (15 liters), a solution of diethyl aluminum chloride (17.4 liters) and hexane (45 liters) was charged under an inert atmosphere, and the temperature was kept at −5° C. Then the temperature of the reactor was increased to 70° C. The contents of the reactor were stirred for 1 hour, and then cooled and allowed to stand. The supernatant liquid was discharged and the catalyst was washed 3 times with hexane (45 liters). 21.0 Kg of β-type titanium trichloride was obtained.

ii. After β-type titanium trichloride (21.0 Kg) and hexane (150 liters) was added, di-n-butyl ether (18 liter) was charged, and the mixture was stirred 1 hour at 40° C, and allowed to stand. The supernatant liquid was discharged and the catalyst was washed 3 times with hexane (45 liters).

iii. Ethyl aluminum dichloride (30.0 liters) and hexane (30 liters) was added to the solid catalyst obtained in the manner described above and then the mixtutre was heated for 2 hours at 90° C. After centrifuging, the catalyst was washed 4 times with hexane (50 liters), and then dried.

iv. Hexane (75 liters) and n-butyl ether (24.9 liters) was added to this dried solid catalyst (20.0 Kg) and the mixture was stirred for 1 hour at about room temperature (i.e., 20° to 30° C). Then the supernatant liquid was discharged. The catalyst was washed 4 times with hexane (50 liters). This catalyst was used for polymerization under dry conditions or slurry conditions (hereinafter designated "Solid Catalyst III" for brevity).

2. Polymerization of Propylene and Refining of Product Polymer

Liquid propylene (1500 Kg/hr), the above-described Solid Catalyst III (40 Kg/hr) and diethyl aluminum chloride (600 g/hr) were charged continuously into a 30 m$^3$ reactor in the presence of hydrogen, and the temperature was kept at 70° C. During this polymerization, the pressure of the reactor was kept at 31.0 to 31.8 Kg/cm$^3$G, and the polymerization slurry was discharged in order to keep the level in the reactor constant.

Under this condition, the discharged polymer slurry comprised solid polymer (590 Kg/hr), polymer dissolved propylene, the so-called atactic polymer (15 Kg/hr) and unreacted liquid propylene including most of the aluminum compound charged (895 Kg/hr).

This polymer slurry was continuously discharged from the bottom of the reactor and charged to the top 8 of the countercurrent multicompartment washing tower 7 (as shown in FIG. 1), and propyleneoxide (150 g/hr) was charged from the sidepipe 16 of 8.

At the same time, refined liquid propylene (1100 Kg/hr) kept at 61° to 64° C was continuously charged from the bottom 9 of the tower. The plate of each compartment, agitator, bottom discharger, baffle plate and each nozzle had an angle of 45° and the tower with 10 compartments was agitated (12 rpm).

During this operation, the pressure of the tower was 26.1 to 27.0 Kg/cm$^2$G. The polymer deposited at the bottom was continuously discharged from line 11 via valve 12 interlocked with level controller LC into the flash tank 13. Liquid propylene (1500 Kg/hr) including the aluminum component of the catalyst and the atactic polymer (15 Kg/hr) was discharged from the top 10 of the tower to the recovery process for the atactic polymer. Loss of fine particle polymer was less than 1%. Thus, the slurry discharged from the bottom of the tower was separated at the flash tank 13, and the refined polymer powder was obtained from the bottom of the tank. The polymer characteristics such as the residue extracted by boiling n-heptane, isotactic index (II%), of this powder, the residual ash in the polymer, and film characteristics such as the blocking of a film of a thickness of 30 μ extruded from a 40 mmφ T-die with normal additives are shown in Table 1 with other examples and comparative examples.

It is obvious from the results in Table 1 that the polymer per unit of the high activity solid catalyst was about 15000 g/g that the refining process is simplified, and that the ash of the polymer obtained using the washing tower of this invention was the same as a conventional polymer obtained but employing a complicated refining process. Further, the above-mentioned II% is higher than 98%, and moreover the extract with liquid propylene at 65° C is substantially zero. Thus the washing efficiency of the washing tower is substantially perfect.

A film produced from this polymer has somewhat improved quality in comparison with a similar commercially available film.

EXAMPLE 2

The procedure described in Example 1 was repeated under substantially the same conditions except that the counter-current fluidized washing tower shown in FIG. 2 was used instead of the counter-current multicompartment washing tower used in Example 1. The polymerization results and the film quality produced from the polymer were the same as in Example 1 and are shown in Table 1.

EXAMPLE 3

The procedure described in Example 1 was repeated under substantially the same conditions except that propylene oxide was not charged from line 16 of the washing tower 7 shown in FIG. 1. The results obtained are shown in Table 1. The quality of the polymer obtained from the bottom of the flash tank 13 and that of the film produced is as the same as in Example 1.

COMPARATIVE EXAMPLES 1

The procedure described in Example 1 was repeated under substantially the same conditions except that the polymerized slurry discharged from the bottom of the reactor 1 was directly introduced into the flash tank 13 without passage through the countercurrent washing tower 7 as shown in FIG. 1. The results are shown in Table 1. Where the polymer was not passed through the tower, the boiling n-hexane extract of II% of the polymer obtained in Example 1 decreased and the residue of aluminum component of the catalyst increased, even if a catalyst of high activity and high yield was used. Although the product could be used as a molding grade polymer, the product diminished in value. Moreover, the quality of a film produced therefrom was inferior to conventional polypropylene film, because the blocking quality was poor, and a large number of bubbles in the film occurred.

COMPARATIVE EXAMPLE 2

The procedure reported in Comparative Example 1 was repeated under substantially the same conditions except that titanium trichloride (Toyo Stauffer Co., Ltd. TiCl$_3$AA) was used instead of the Solid Catalyst III prepared in Example 1. The results are shown in Table 1. Comparative Example 2 was inferior to Comparative Example 1 in catalyst efficiency, II%, residual ash, film characteristics.

COMPARATIVE EXAMPLE 3

The procedure described in Example 1 was repeated under substantially the same conditions except that commercially available titanium trichloride AA was used instead of Solid Catalyst III prepared in Example 1. The results in Table 1 show that the effect of the washing tower was observed sufficiently, but loss of the solid polymer from the discharge line 10 of the top of the washing tower was 3.5% and was higher than that of Example 1. When the agitation speed of the washing tower was not increased, sometimes the bottom of the tower could not be discharged. The residual ash (mainly titanium component) of the polymer obtained from the bottom 13 of the flash tank was higher than that of Example 1. The product could be used as a molding grade polymer, but the film or fiber produced therefrom, which requires high quality, was inferior to conventional polypropylene.

EXAMPLE 4

1. Catalyst Preparation i. After a 200 liter autoclave was charged with hexane (48 liters) and titanium tetrachloride (21 Kg), a solution of diethyl aluminum chloride (17 Kg) and hexane (45 liters) was charged under an inert atmosphere, and was kept at 0° C. The time required for charging the solution was 4 hours. Then the temperature of the reactor was increased to 65° C. The contents of the reactor were stirred for 1 hour, and then cooled and allowed to stand.

Then the supernatant liquid was discharged, and the catalyst was washed 5 times with hexane (50 liters).

ii. After hexane (110 liters) and diisoamyl ether (16 Kg) was added, the autoclave was kept at 35° C, and the contents were stirred for 1 hour, and allowed to stand. The supernatant liquid was discharged, and the catalyst was washed 5 times with hexane (50 liters).

iii. After hexane (41 liters) and titanium tetrachloride (48 Kg) was added, the contents were stirred and kept at 65° C for 2 hours, and then cooled and allowed to stand.

The supernatant liquid was discharged and the catalyst was washed 5 times with hexane (50 liter). Then a solid Catalyst 4 (17 Kg) was obtained. This catalyst 4 was used in the following polymerization.

2. Polymerization of Propylene and Refining of Product Polymer

The procedure described in Example 1 was repeated under substantially the same conditions except that the above described Catalyst 4 was used instead of the catalyst prepared in Example 1. The results obtained are shown in Table 1. Although the residual ash of the titanium component was slightly higher than that of Example 1, other results, e.g., the efficiency of the washing tower, film quality, etc. were similar to those of Example 1.

TABLE 1

| | | Example 1 | Example 2 | Example 3 | Example 4 |
|---|---|---|---|---|---|
| Catalyst | | | | | |
| | Catalyst Designation | Solid Catalyst III | Solid Catalyst III | Solid Catalyst III | Catalyst 4 |
| | Flow Rate of Titanium Component (g/hr) | 40 | 40 | 40 | 75 |
| | Flow Rate of Aluminum Component (g/hr) | 600 | 600 | 600 | 600 |
| Washing | | | | | |
| | Washing Type | Multi-compartment | Fluidized Layer | Multi-compartment | Multi-compartment |
| | Flow Rate of Catalyst Deactivator (g/hr) | 150 | 150 | — | 150 |
| Polymerization Result | | | | | |
| | Solid Polymer in Slurry (Kg/hr) | 590 | 590 | 590 | 592 |
| | Soluble Polymer in Slurry (Kg/hr) | 15 | 15 | 15 | 12 |
| | Catalyst Efficiency (g/g) | 15,100 | 15,100 | 15,100 | 8,000 |
| Polymer Characteristics | | | | | |
| | II (%) | 98.5 | 98.2 | 98.2 | 98.0 |
| | T-Ash (ppm) | 70 | 72 | 75 | 108 |
| | $TiO_2$ (ppm) | 35 | 32 | 37 | 67 |
| | $Al_2O_3$ (ppm) | 21 | 25 | 27 | 25 |
| | $[\eta]$ (dl/g) | 1.95 | 1.98 | 1.98 | 1.97 |
| Film Characteristics | | | | | |
| | Blocking (g/100cm$^2$) | 13 | 15 | 18 | 18 |
| | Haze (%) | 2.3 | 2.2 | 2.2 | 2.0 |
| | Young's Modulus (Kg/cm$^2$) | 6650 | 6500 | 6650 | 6600 |
| | Bubbles | None | None | None | None |

| | | Comparative Example 1 | Comparative Example 2 | Comparative Example 3 |
|---|---|---|---|---|
| Catalyst | | | | |
| | Catalyst Designation | Solid Catalyst III | $TiCl_3AA$ | $TiCl_3AA$ |
| | Flow Rate of Titanium Component (g/hr) | 40 | 180 | 180 |
| | Flow Rate of Aluminum Component (g/hr) | 600 | 600 | 600 |
| Washing | | | | |
| | Washing Type | — | — | Multi-compartment |
| | Flow Rate of Catalyst Deactivator (g/hr) | — | — | 150 |
| Polymerization Result | | | | |
| | Solid Polymer in Slurry (Kg/hr) | 590 | 605 | 605 |
| | Soluble Polymer in Slurry (Kg/hr) | 16 | 68 | 68 |
| | Catalyst Efficiency (g/g) | 15,100 | 3,700 | 3,700 |
| Polymer Characteristics | | | | |
| | II (%) | 93.0 | 87.0 | 94.0 |
| | T-Ash (ppm) | 602 | 720 | 170 |
| | $TiO_2$ (ppm) | 55 | 150 | 132 |
| | $Al_2O_3$ (ppm) | 505 | 490 | 23 |
| | $[\eta]$ (dl/g) | 1.98 | 1.96 | 2.01 |
| Film Characteristics | | | | |
| | Blocking (g/100cm$^2$) | 75 | 87 | 25 |
| | Haze (%) | 2.2 | 2.5 | 2.1 |

TABLE 1-continued

| | | | |
|---|---|---|---|
| Young's Modulus (Kg/cm²) | 5010 | 5020 | 6620 |
| Bubbles | Present | Present | Present |

Notes:
1) II: Weight percent of the residue extracted by boiling n-heptane using a Soxhlet extractor
2) T-Ash. Ash of $TiO_2$ and $Al_2O_3$: the colorimetric analysis value obtained on burning the polymer powder
3) η: Intrinsic viscosity in a tetralin solution at 135° C
4) Blocking: Sample was treated 3 hours at 60° C under 40 g/cm². This sample was measured using a Blocking tester manufactured Shimazu Co., Ltd.
5) Haze: Determined in accordance with ASTM D-1003
6) Young's modulus: Measured at a rate or 5 mm/min with a test piece of a width of 20 mm and a length of 60 mm.

While the invention has been described in detail and with reference to specific embodiments thereof, it will be apparent to one skilled in the art that various changes and modifications can be made therein without departing from the spirit and scope thereof.

What is claimed is:

1. A bulk polymerization process for producing a homopolymer or a copolymer of propylene, which comprises polymerizing propylene or a mixture of propylene and another unsaturated hydrocarbon monomer in liquid propylene in the presence of a catalyst system consisting essentially of (a) an activated titanium compound obtained by (1) reducing titanium tetrachloride with an organoaluminum compound represented by the formula $$R_nAlX_{3-n} \qquad (I)$$

wherein R represents a straight or branched chain alkyl group having 1 to 18 carbon atoms, an alicylic hydrocarbon group or an aromatic hydrocarbon group, X represents a halogen atom, an n is a value of from 1 to 3, inclusive to obtain a β-type titanium trichloride, (2) reacting the resulting β-type titanium trichloride with an ether, (3) reacting the solid catalyst thus obtained with (i) an organoaluminum compound represented by the formula $$R'_mAlX_{3-m} \qquad (II)$$

wherein R' represents a straight or branched chain alkyl group having 1 to 18 carbon atoms, an alicyclic hydrocarbon group or an aromatic hydrocarbon group, X represents a halogen atom, and m is a value of $0<m<1.5$, followed by further reacting the resulting solid catalyst with an ether, or (ii) titanium tetrachloride and (b) an organoaluminum compound, withdrawing the obtained polymer slurry from the polymerization zone, introducing the polymer slurry into an upper part of a counter-current washing zone and counter-currently contacting the polymer slurry with liquid propylene introduced into a lower part of the washing zone, whereby the polymer and catalyst residue dissolved in the polymer slurry are removed.

2. The process according to claim 1, wherein said counter-current washing zone is a counter-current multi-compartment washing tower having more than 5 compartments each provided with a conical agitator and an opposite conical fixed partition plate, each plate having a ratio of an opened area to an inner cross-sectional area of the tower of 20 to 50% and a declivity of 10° to 80°, and the ratio of the flow rate of the rising liquid introduced into the lower part of the tower to that of a feed of liquid in the slurry introduced into the upper part of the tower being within a range of from ½ to 2.

3. The process according to claim 1, wherein said counter-current washing zone is a counter-current fluidized washing tower comprising multiagitators constructed simply with straight paddles, installed in the vertical position with respect to the agitating axis, in the lower part of the tower and providing a fluidized bed.

4. The process according to claim 1, wherein the other unsaturated hydrocarbon monomer is ethylene.

5. The process according to claim 1, wherein the polymerizing is at a temperature of about 30° to 90° C under a pressure such that the propylene is liquid for about 1 to 20 hours.

* * * * *